(12) United States Patent
Shapiro (10) Patent No.: US 7,296,967 B2
(45) Date of Patent: Nov. 20, 2007

(54) COUNTERFLOW FILM COOLED WALL

(75) Inventor: Jason David Shapiro, Methuen, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/224,922

(22) Filed: Sep. 13, 2005

(65) Prior Publication Data

US 2007/0059178 A1    Mar. 15, 2007

(51) Int. Cl.
*F01D 5/22* (2006.01)
(52) U.S. Cl. .................. 415/115; 415/116; 416/97 R; 416/191
(58) Field of Classification Search ............. 415/115, 415/116, 175, 176, 173.1, 228; 416/95, 96 R, 416/97 R, 179, 189, 191, 192
See application file for complete search history.

(56) References Cited

U.S. PATENT DOCUMENTS

| | | | |
|---|---|---|---|
| 3,583,824 A | 6/1971 | Smuland | |
| 4,497,610 A | 2/1985 | Richardson et al. | |
| 4,573,867 A | 3/1986 | Hand | |
| 5,062,768 A | 11/1991 | Marriage | |
| 5,169,287 A | 12/1992 | Proctor et al. | |
| 5,584,651 A | 12/1996 | Pietraszkiewicz et al. | |
| 5,993,150 A | 11/1999 | Liotta et al. | |
| 6,155,778 A | 12/2000 | Lee et al. | |
| 6,196,792 B1 | 3/2001 | Lee et al. | |
| 2005/0111965 A1 | 5/2005 | Lowe et al. | |

FOREIGN PATENT DOCUMENTS

JP        58051202 A    *    3/1983

OTHER PUBLICATIONS

GE Aircraft Engines, "Turbine Shroud A," in public use or on sale in US for more than one year before Aug. 2005.
GE Aircraft Engines, "Turbine Shroud B," in public use or on sale in US for more than one year before Aug. 2005.

* cited by examiner

*Primary Examiner*—Richard A. Edgar
(74) *Attorney, Agent, or Firm*—David L. Narciso; Francis L. Conte (57) ABSTRACT

A turbine wall includes opposite back and front sides. Film cooling holes are inclined longitudinally through the wall. Adjacent holes are spaced laterally apart and are inclined oppositely for channeling cooling air therethrough in counterflow.

28 Claims, 7 Drawing Sheets

FIG. 7

COUNTERFLOW FILM COOLED WALL

The U.S. Government may have certain rights in this invention pursuant to contract number K7844-GN-03-5266E awarded by the U.S. Department of the Navy.

BACKGROUND OF THE INVENTION

The present invention relates generally to gas turbine engines, and, more specifically, to film cooled components therein.

In a gas turbine engine, air is pressurized in a compressor and mixed with fuel in a combustor for generating hot combustion gases. Energy is extracted from the gases in a high pressure turbine (HPT) which in turn powers the compressor. Additional energy is extracted in a low pressure turbine (LPT) for powering an upstream fan in a turbofan aircraft engine application, or for powering an external drive shaft for marine and industrial applications.

Since the combustion gases have extremely high temperature, most of the turbine components over which the gases flow are typically cooled using a portion of the air bled from the compressor. These components are typically made of state-of-the-art superalloy metals which have enhanced strength at elevated temperature for maximizing the useful life thereof.

These superalloy components typically have tailored cooling configurations therefor which typically include internal cooling circuits for initially cooling the inside of the components, with rows of film cooling holes extending through the walls of these components for discharging the spent cooling air. The film cooling holes are inclined at a shallow inclination or slope angle of about 15 degrees for optimally discharging the spent cooling air in a thin film which flows downstream over the external surface of the component for providing a thermally insulating air layer between the component and the external combustion gases.

Since any air diverted from the combustion process decreases overall efficiency of the engine, the amount of air bled from the compressor should be minimized for maximizing the efficiency of the engine, but a sufficient quantity of the bleed cooling air is nevertheless required for cooling the various turbine components to ensure a suitably long useful life thereof and minimizing the degradation thereof due to thermal distress.

The prior art in gas turbine engine cooling configurations is replete with myriad configurations of film cooling holes and patterns thereof correspondingly tailored to the specific application in the engine. For example, the combustion gases are born in the combustor of the engine which is typically defined by radially outer and inner combustor liners having various film cooling holes therein for effecting liner cooling.

A first stage turbine nozzle is disposed at the outlet of the combustor and includes a row of hollow airfoil vanes mounted between radially outer and inner supporting bands. The vanes and bands typically include various patterns of film cooling holes for cooling thereof.

A first stage row of turbine rotor blades immediately follows the first stage nozzle, with each blade having an airfoil formed with an integral platform and dovetail mounted to the perimeter of a supporting rotor disk. The airfoil includes a radially outer tip spaced closely adjacent to a surrounding annular turbine shroud for minimizing the leakage of combustion gases therebetween.

The blade airfoil includes yet another pattern of film cooling holes through the sidewalls thereof for cooling the rotor blade during operation. And, additional turbine vane and blade stages are used in the turbine sections for extracting energy from the combustion gases, and are correspondingly cooled with typically different patterns of film cooling holes due to the decrease in temperature of the combustion gases as energy is extracted therefrom in the downstream direction.

Turbine shrouds are one exemplary turbine component which bound the hot combustion gases and must be protected from the high heat loads therefrom. The typical turbine shroud includes an arcuate plate or wall having a forward hook or rail extending from the back side thereof, and an axially opposite aft rail or hook extending from the back side at the aft end. The two hooks are used for suitably suspending the turbine shroud from a hanger mounted to a supporting casing in the engine.

The front side, or radially inner surface of the turbine shroud faces the row of blade tips and provides a smooth outer boundary for the combustion gases which flow downstream between the turbine blades. The turbine shroud is typically formed in arcuate segments, with a complete row of shroud segments defining the collective annular shroud.

Turbine shrouds are found in the prior art in various configurations, and with various cooling configurations. In one embodiment, the shroud wall is imperforate without any film cooling holes extending therethrough, but the front side is covered with a conventional thermal barrier coating (TBC) that provides a ceramic thermal insulating barrier between the superalloy metal of the shroud itself and the hot combustion gases flowing between the turbine blades.

However, the TBC is subject to undesirable erosion when the gas turbine engine is flown in an aircraft in a sandy environment. Such erosion will lead to a reduction in useful life of the shroud.

It is desired to eliminate this erosion problem of the TBC, by eliminating the TBC itself. Without the use of TBC, the turbine shroud will require film cooling thereof for meeting and exceeding the corresponding life of the TBC coated shroud, but with a small performance penalty due to the need to bleed additional air from the compressor for shroud cooling.

One problem with the use of film cooling holes in a turbine shroud, for example, is the specific geometry thereof and limited surface area due to the supporting hooks. In conventional designs, cooling air is provided to the back side of the turbine shroud between the forward and aft hooks and is then channeled through inclined film cooling holes extending through the shroud wall to the front side thereof.

The forward and aft shroud hooks are spaced axially apart from each other and define a central pocket in the back side of the shroud in which the inlets for the film cooling holes may be distributed. The back side pocket is also bounded by corresponding side rails that complete the perimeter of the shroud segments between which are typically installed spline seals for maintaining the circumferential continuity of the turbine shroud.

The central supply pocket for the cooling air has a correspondingly smaller surface area than the surface area of the shroud front side which is fully exposed to the hot combustion gases during operation. The film cooling holes are therefore limited in pattern and inclination or slope for accommodating the smaller area of the pocket from which the cooling air is distributed to the larger front side of the shroud.

Optimum performance of the typical film cooling hole is achieved with a slope or inclination angle of about 15 to about 20 degrees for providing a shallow discharge angle with the external surface of the component along which the discharged air flows in a film downstream therefrom. The air is discharged from each hole in a jet of relatively high pressure, and shallow discharge angles are desired for limiting the lift-off tendency of the air jet on the external surface. The film air should remain attached to the external surface for maximizing its effect in film cooling.

Film cooling holes are typically arranged in rows with their optimal inclination angle where possible. Near the perimeter of the turbine shroud, however, the perimeter geometry typically requires modification of the pattern of film cooling holes, and also typically requires inclination angles substantially greater than the shallow optimum value, and sometimes approaching substantially perpendicular inclination angles through the shroud wall.

Accordingly, the use of non-optimal inclined film cooling holes in a gas turbine engine component reduces efficiency of the cooling therefrom, which in turn typically requires additional cooling holes and additional cooling air bled from the compressor for achieving the desired useful life for the component, such as the turbine shroud disclosed above in particular.

It is therefore desired to provide a turbine wall with an improved configuration of film cooling holes therein for enhancing film cooling thereof while reducing the amount of air flow required therefor.

BRIEF DESCRIPTION OF THE INVENTION

A turbine wall includes opposite back and front sides. Film cooling holes are inclined longitudinally through the wall. Adjacent holes are spaced laterally apart and are inclined oppositely for channeling cooling air therethrough in counterflow.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
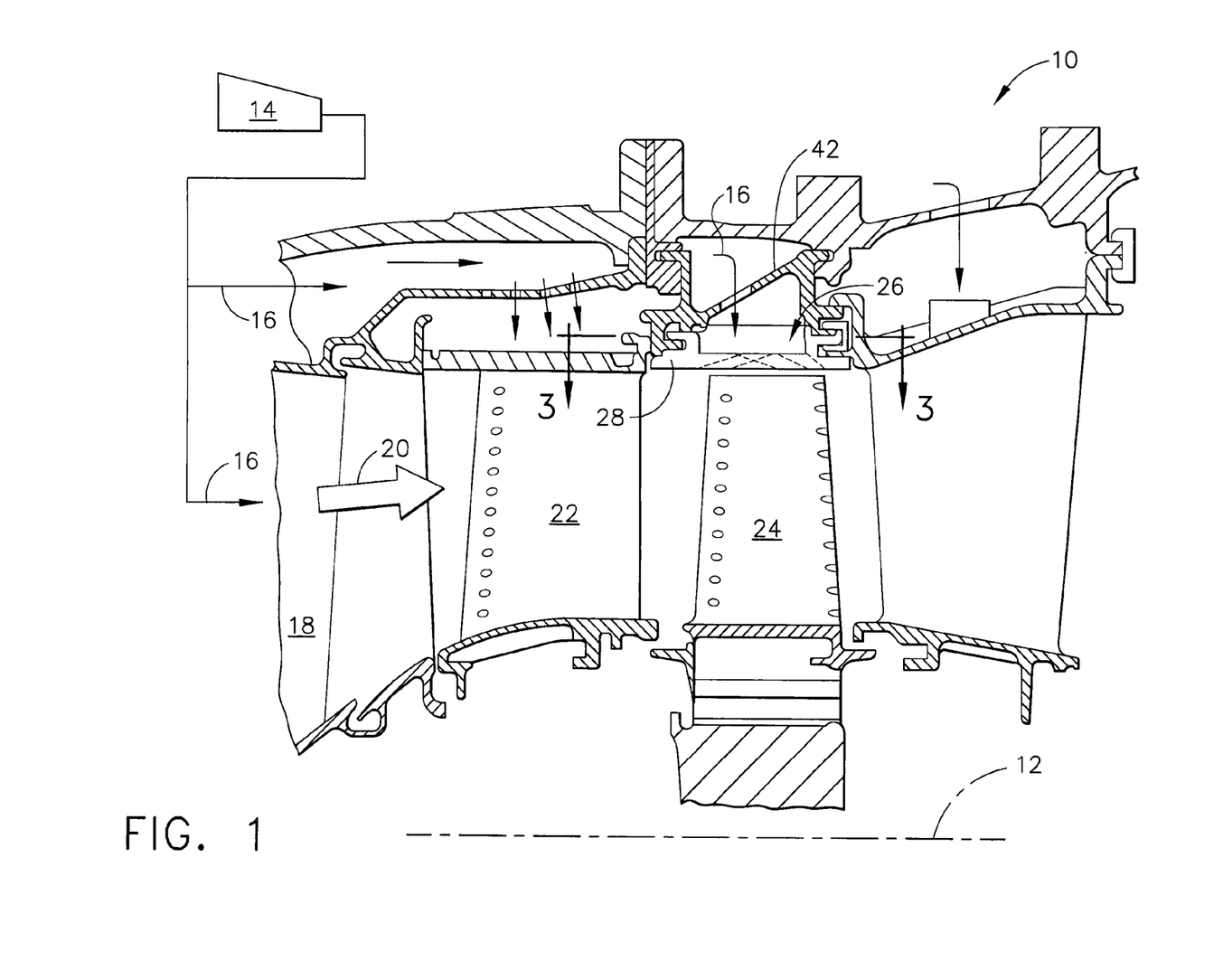
FIG. 1 is an axial sectional view of a portion of an aircraft gas turbine engine.

Illustrated schematically in FIG. 1 is a portion of a gas turbine engine 10 configured for powering an aircraft in flight in a typical application. The engine is axisymmetrical around an axial centerline axis 12 and includes a conventional, multistage axial compressor 14 which is effective for pressurizing air 16 during operation.

The pressurized air is mixed with fuel in an annular combustor 18, shown in aft part, for generating hot combustion gases 20 that are discharged from the outlet thereof during operation.

A first stage turbine nozzle includes a row of hollow first stage nozzle vanes 22 supported between radially outer and inner bands at the outlet end of the combustor. The vanes are configured for directing the combustion gases 20 obliquely into a row of first stage turbine rotor blades 24 disposed directly aft therefrom in the downstream direction in the longitudinal direction along the engine centerline axis 12. Additional stages of nozzle vanes and rotor blades follow the first stage rotor blades in a conventional configuration.

The first stage blades 24 include integral dovetails mounted in corresponding slots in the perimeter of a supporting rotor disk, which disk in turn is joined to the rotor of the compressor 14 for powering the several rows of compressor blades therein.

The rows of vanes 22 and blades 24 define the first stage of the HPT, which may include a second stage, and is followed typically by several stages of the LPT that extract further energy from the combustion gases. The rotor of the LPT is typically joined to a fan (not shown) in a typical aircraft engine application, or may be joined to an external drive shaft (not shown) for typical marine and industrial applications.

As indicated above in the Background section, the combustion gases 20 are quite hot during operation and correspondingly provide high heat loads to the various metal components over which the combustion gases flow during operation. Accordingly, the various turbine components exposed to the combustion gases are typically cooled by bleeding a portion of the pressurized air 16 from the compressor, which air, therefore, bypasses the combustor and reduces overall efficiency of the engine.

The liners of the combustor 18, the nozzle vanes 22 and their supporting bands, and the turbine blades 24 are some examples of typical turbine components which may be cooled by the pressurized air 16 using conventional film cooling holes, among other types of cooling features.

In particular, however, a specific form of turbine component which may enjoy improved film cooling as disclosed hereinbelow is the first stage turbine shroud 26. The turbine shroud is illustrated in axial section in FIG. 1 and comprises an annular outer boundary for the combustion gases 20 that flow downstream between the first stage turbine blades 24.

Figure 2:
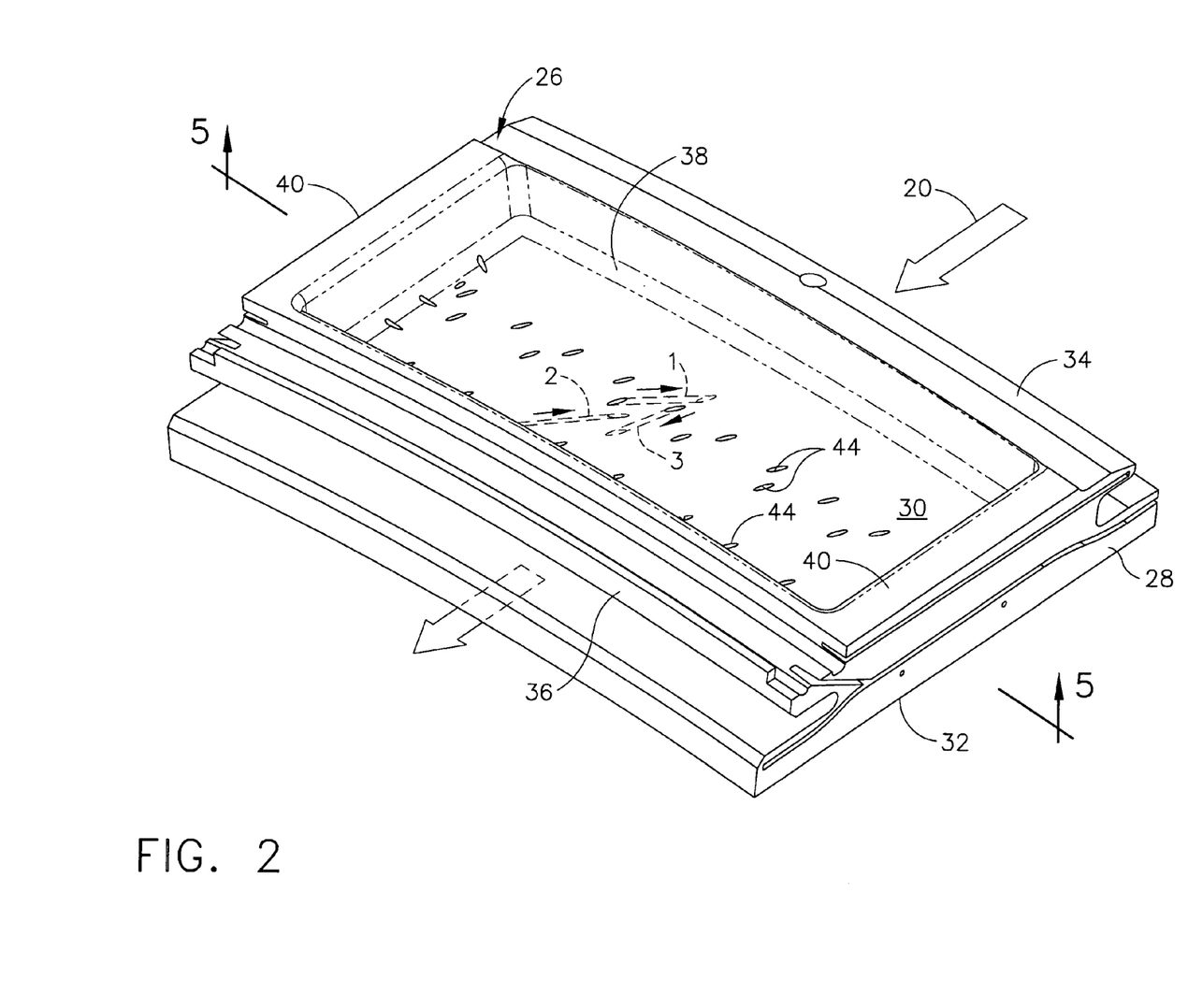
FIG. 2 is an isometric view of the top or backside of an exemplary portion of the first stage turbine shroud illustrated in FIG. 1.
Figure 3:
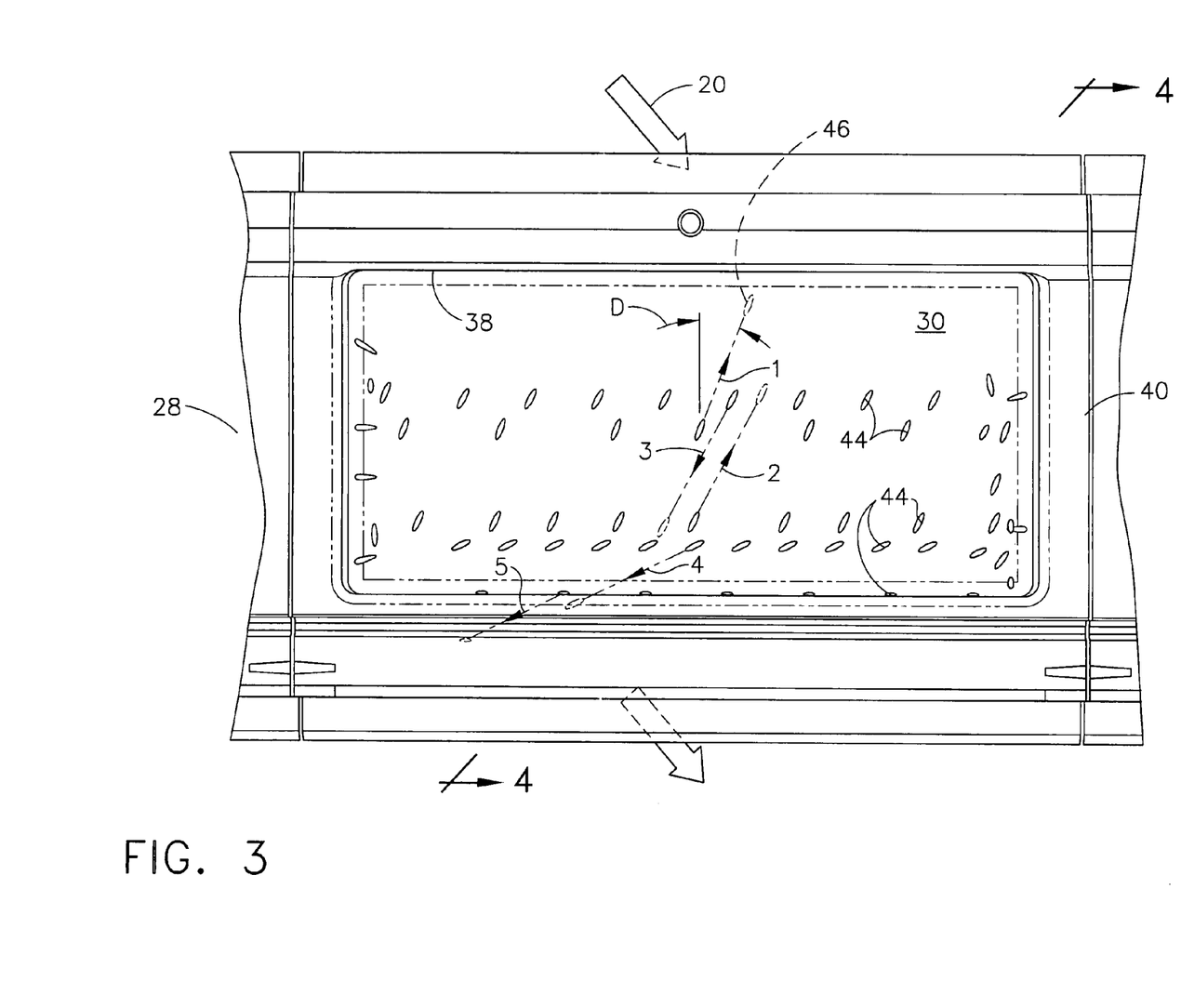
FIG. 3 is a planiform view of an arcuate portion of the turbine shroud illustrated in FIG. 2 disposed in the collective annular shroud illustrated in FIG. 1 and taken generally along line 3-3.
Figure 4:
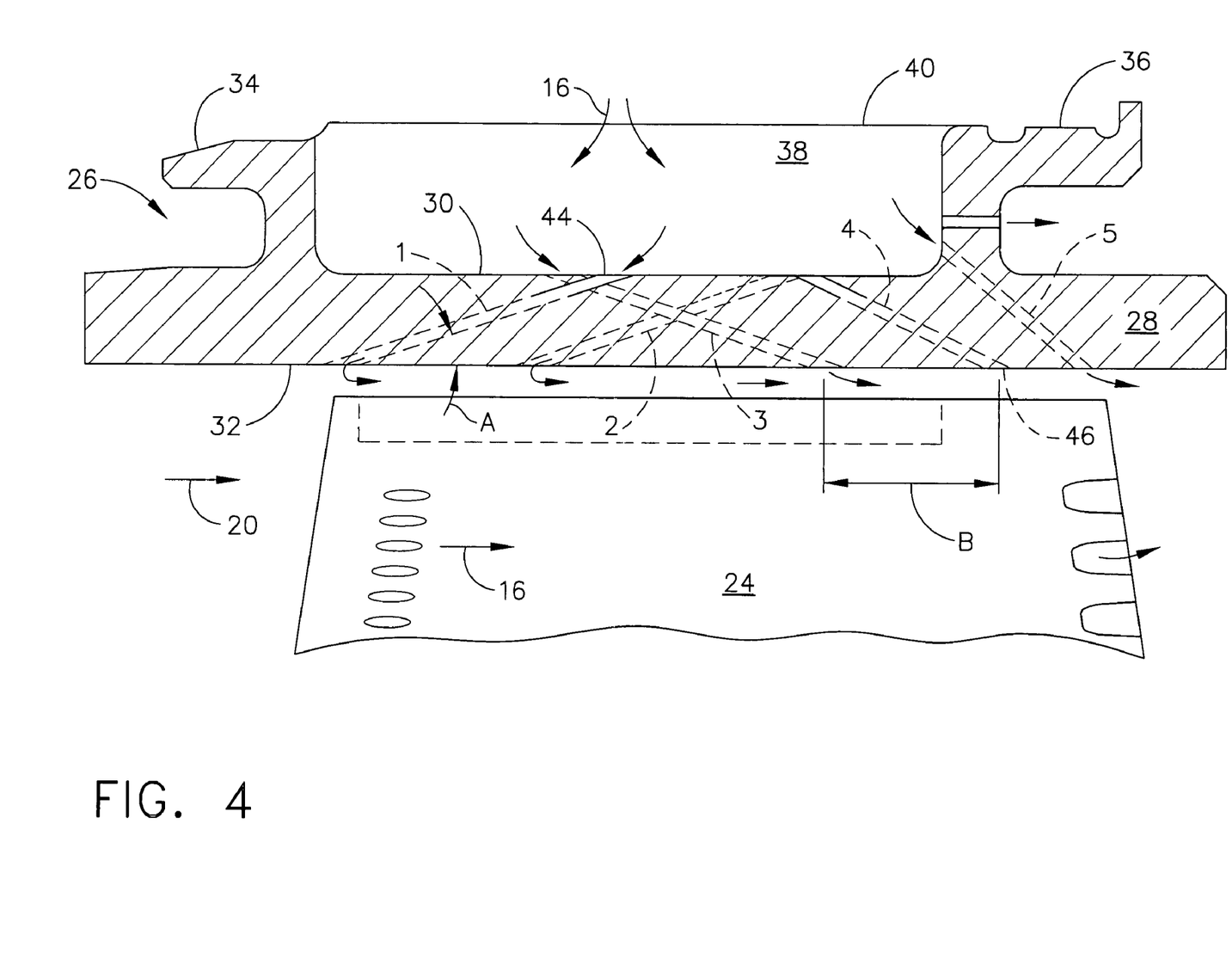
FIG. 4 is an elevational sectional view through the turbine shroud illustrated in FIG. 3 and taken along inclined line 4-4 in position above the tip of the first stage turbine rotor blade.

The turbine shroud 26 is typically formed in a row of arcuate segments one of which is illustrated in isolation in FIG. 2 that adjoin each other circumferentially as illustrated in part in FIG. 3, with conventional spline seals (not shown) being mounted in corresponding slots in the split-line joints between the shroud segments. FIG. 4 illustrates a typical axial cross section through the turbine shroud 26 positioned closely adjacent to the radially outer tip of the first stage turbine rotor blades 24.

As initially shown in FIG. 2, each segment of the turbine shroud 26 includes an arcuate plate or wall 28 having a suitable radius from the centerline axis of the engine. The shroud wall 28 includes a radially outer back surface or side 30, and an opposite, radially inner front surface or side 32, with a suitable thickness therebetween.

An axially forward rail or hook 34 extends from the back side 30 immediately aft of the leading edge thereof, and an axially aft rail or hook 36 is disposed at the longitudinally or axially opposite end of the wall spaced forwardly of the trailing edge thereof.

A central pocket 38 is bounded axially forward and aft by the opposite hooks 34,36, and is additionally bounded circumferentially or laterally by integral side rails 40. The opposite side rails include end slots in which conventional spline seals (not shown) are mounted for sealing the joint between circumferentially adjoining segments of the collective turbine shroud when assembled in the engine around the full row of turbine rotor blades as illustrated in FIG. 1. The turbine shroud 26 is mounted by its forward and aft hooks 34,36 to a surrounding hanger 42, which in turn is suspended from an annular casing of the engine.

The basic configuration of the turbine shroud 26 as illustrated in FIGS. 1 and 2 is conventional and defines the outer flowpath or boundary for the hot combustion gases as they flow axially downstream between the first stage turbine rotor blades 24. The turbine shroud 26 may be formed of a conventional superalloy metal having enhanced strength at the elevated temperatures experienced in the hostile environment of the HPT. The turbine shroud 26 is modified as described hereinbelow for providing enhanced cooling thereof during operation.

As initially shown in FIGS. 3 and 4, the shroud wall 28 includes a plurality or multitude of film cooling holes 1,2,3,4,5 arranged in multiple rows extending circumferentially or laterally over the width of the turbine shroud. As shown in sectional view in FIG. 4, each of the film cooling holes is inclined longitudinally through the wall 28 at an inclination or slope angle A.

The slope angle is preferably shallow in the optimum range of about 15 degrees to about 20 degrees where possible for discharging cooling air 16 in a thin film along the front side 32 of the wall for creating a thermally insulating air film therealong in the downstream direction. The cooling air 16 is a portion of the pressurized air bled from the compressor 14 and is suitably channeled through the hanger 42 as illustrated in FIG. 1, and is initially received in the pocket 38 on the back side of the turbine shroud.

Figure 6:
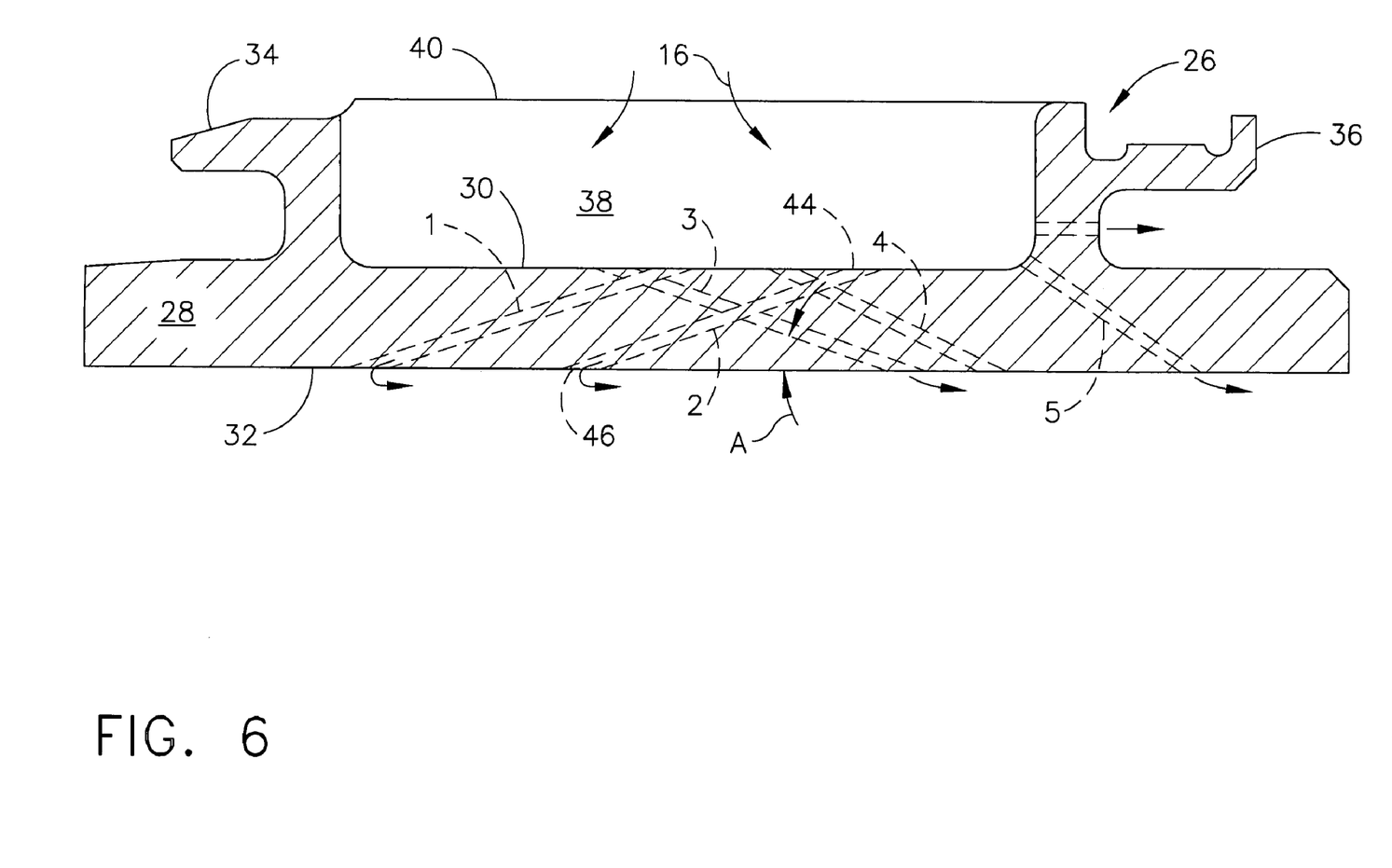
FIG. 6 is an axial sectional view, like FIG. 4, of the turbine shroud illustrated in FIG. 5 and taken along jog line 6-6.

As initially shown in FIGS. 4 and 6, each of the five rows of film cooling holes 1-5 includes a corresponding inlet 44 disposed on the back side 30 of the wall inside the pocket 38. Each of the five rows also includes a corresponding outlet 46 disposed on the front side 32 of the wall. The individual holes themselves are conventional and may be cylindrical and suitably formed by laser drilling in conventional practice.

Since the film cooling holes are inclined at the shallow slope angle, the respective inlets 44 and outlets 46 will form oval or elliptical perimeters on the opposite sides 30,32 of the wall. Each film cooling hole 1-5 is therefore a discrete and independent hole that receives the cooling air 16 from the pocket 38 and discharges that air in a corresponding jet at a shallow discharge angle along the front side 32 of the wall which is directly exposed to the hot combustion gases flowing between the turbine blades.

Figure 5:
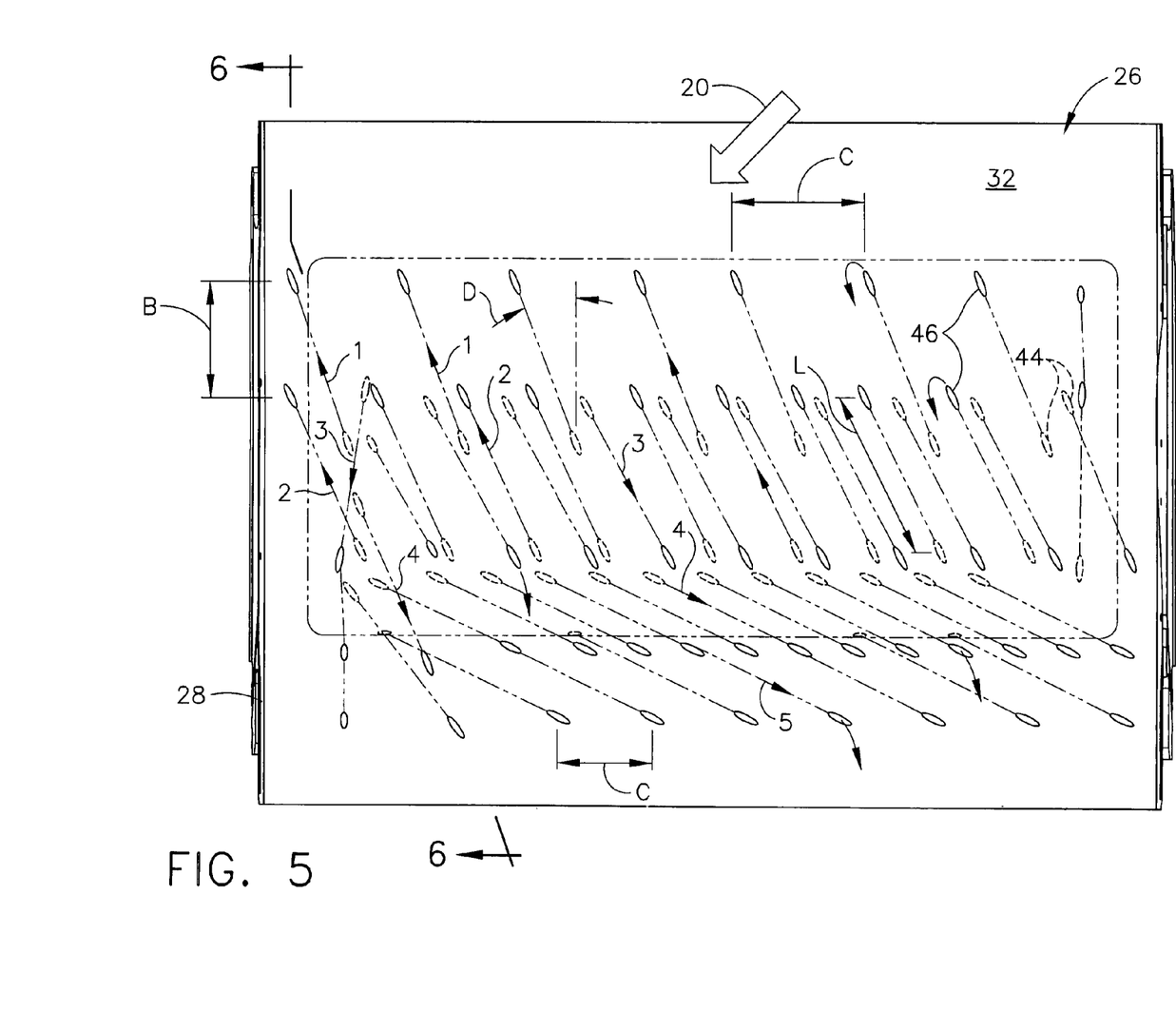
FIG. 5 is a bottom or underside view of the turbine shroud illustrated in FIG. 2 and taken along line 5-5.

The various outlets 46 of the film cooling holes are illustrated in FIG. 5 in five rows extending circumferentially or laterally across the width of the turbine shroud, with the outlets and rows being suitably spaced apart axially along the downstream flow direction of the combustion gases 20 at a longitudinal pitch or spacing B, which varies from row to row as desired for maximizing the cooling effectiveness of the pattern of outlet holes. And, the outlets 46 in each of the five rows have a circumferential or lateral pitch or spacing C also selected for maximizing cooling effectiveness.

As indicated above in the Background section, film cooling holes are quite conventional and are found in various configurations, various orientations, and various patterns typically tailored for the specific turbine engine component that requires film cooling against the heat loads from the hot combustion gases.

However, conventional film cooling holes are typically arranged in uniform rows, with adjacent rows thereof having similarly inclined film cooling holes disposed in a unidirectional pattern. The adjacent rows may therefore be packed closely together in high density where required without the film cooling holes intersecting each other or being too closely packed together which would reduce the mechanical strength of the metal substrate itself.

In the example of the turbine shroud illustrated in FIG. 2, the forward and aft hooks 34,36, and the side rails 40 occupy a substantial portion of the surface area of the back side 30 and limit the ability to introduce suitable film cooling holes through the wall thereof. The perimeter of the pocket 38 limits the location of the film cooling holes by placing the inlets therein, and typically requires inclination angles of the film cooling holes to significantly exceed the optimum shallow range of 15-20 degrees for the placement thereof.

Inclination angles approaching perpendicular to the turbine wall may be required of the film cooling holes located near the boundary of the central pocket 38 for effectively discharging cooling air near the perimeter of the front side 32. Such oblique film cooling holes effect reduced efficiency, and correspondingly require more of such oblique holes, and the use of more cooling air bled from the compressor for achieving the desired long useful life of the turbine shroud.

As shown in FIGS. 4 and 5, the film cooling holes 1-5 in the five rows are spaced apart laterally at a suitable lateral spacing C in each row, with the holes from row to row being suitably laterally spaced apart or offset from each other to stagger the rows along the lateral direction. Correspondingly, longitudinally adjacent rows may then be inclined in opposite aft and forward directions respectively for channeling the cooling air 16 therethrough in counterflow.

Figure 7:
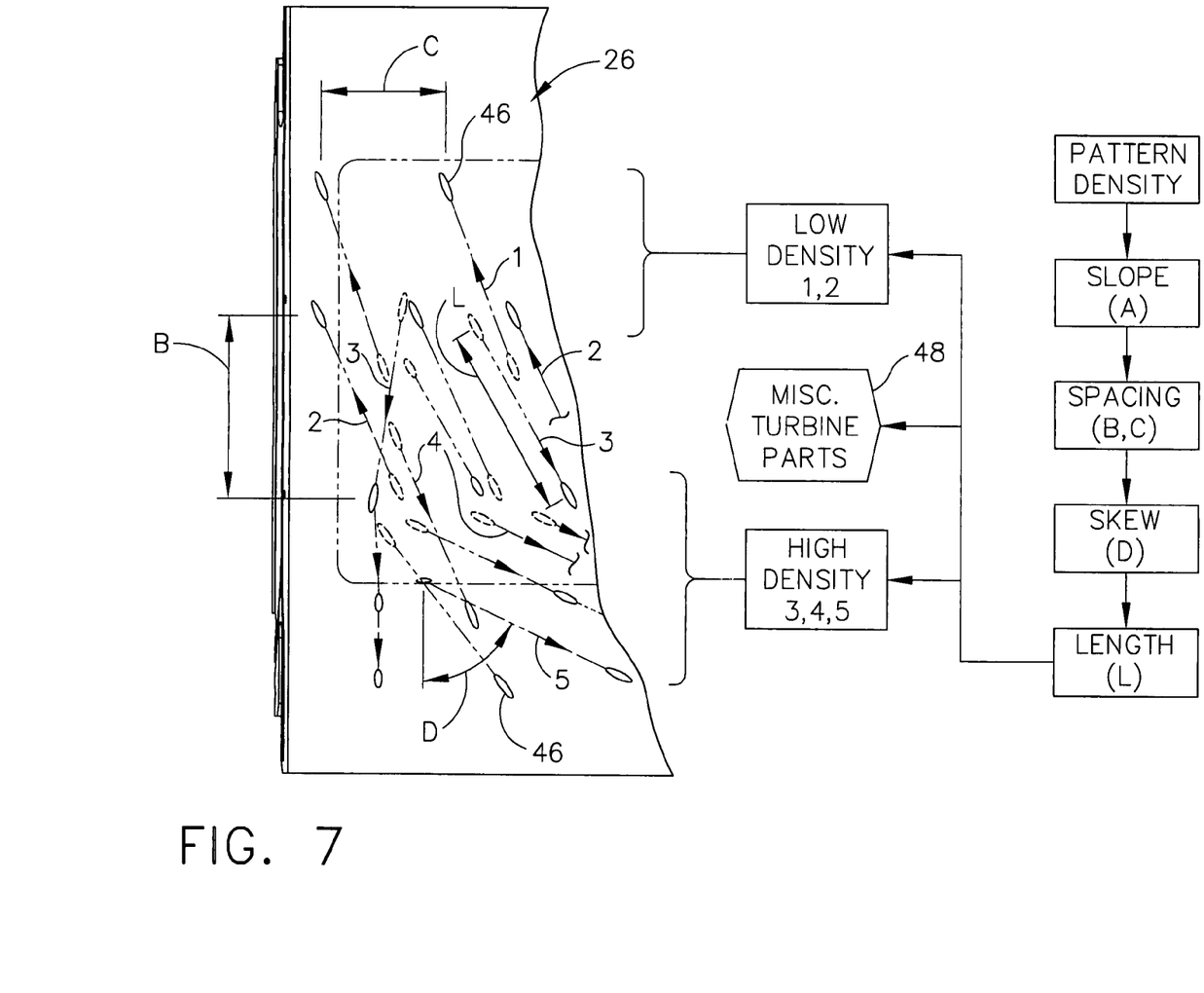
FIG. 7 is a plan view of a portion of the front side of the turbine shroud illustrated in FIG. 5, along with a flowchart method for distributing the film cooling holes therein.

For example, in a method of distributing a multitude of film cooling holes 1-5 through the wall 28 illustrated in FIGS. 4 and 7, multiple rows thereof such as the aft three rows of film cooling holes 3,4,5 are distributed longitudinally and laterally through the wall and inclined longitudinally therethrough in a first or aft direction for effecting a corresponding pattern of the outlets 46 thereof on the front side 32 of the wall for in turn effecting film cooling of the front side by the collective discharge of corresponding air jets from the individual holes.

Correspondingly, additional rows such as the two forward rows of film cooling holes 1,2 may be distributed longitudinally and laterally through the wall 28 and inclined longitudinally therethrough in a second or forward direction opposite to the first direction of the aft rows. The forward inclined holes 1,2 are offset or staggered laterally from the aft inclined holes 3,4,5 as best illustrated in FIG. 5.

In FIG. 5, the outlets 46 are shown in solid line on the exposed front side 32 of the shroud. The corresponding inlets 44 of the five rows of film cooling holes are shown in dashed line on the opposite, hidden back side 30 of the shroud. And, the longitudinal centerline axes of the individual film cooling holes are shown in phantom line, with arrows indicating the corresponding forward and aft directions of the film cooling air discharged therethrough.

Counterflow of film cooling air may be locally effected where desired in adjacent pairs of film cooling holes preferably in adjacent rows or pair of rows which may use the lateral offset or stagger between holes to advantage.

As shown in FIGS. 3 and 4, all of the inlets 44 of the five rows of holes 1-5 are spaced apart laterally and longitudinally inside the common pocket 38 on the back side 30 of the wall 28. Each of the film cooling holes 1-5 has a single outlet 46 corresponding to the single inlet 44, with the outlets 46 also being spaced apart laterally and longitudinally on the opposite front side 32 of the wall 28 in correspondingly different two dimensional (2D) patterns for discharging discrete jets from each of the multitude of film cooling holes.

As shown in FIG. 4, the film cooling holes in longitudinally adjacent rows are inclined oppositely between respective inlets 44 and outlets 46 to channel the cooling air 16 in longitudinal counterflow in discrete jets of air spaced laterally apart. In this counterflow configuration, laterally adjacent film cooling holes longitudinally overcross or overlap each other, at least in part, without intersecting each other.

For example, FIGS. 4 and 5 illustrate that the first row of holes 1 is inclined forwardly in counterflow with the third row of holes 3 which is inclined in the aft direction. The third row of holes 3 is also disposed in counterflow with the second row of holes 2 which is also inclined in the forward direction like the first row.

And, the second row of holes 2 is also disposed in counterflow with the fourth row of holes 4 in the FIG. 6 species, but not in the FIG. 4 species. The fifth row of holes 5 provides additional film cooling in parallel with the fourth row of holes 4, both rows being inclined in the aft direction.

The advantage of the counterflow combination of longitudinally and laterally adjacent film cooling holes may be appreciated in FIG. 4. If the first two rows of holes 1,2 were not in counterflow with the third and fourth rows, they would have to be longitudinally or axially spaced apart therefrom more closely to the forward hook where space permits, or alternatively, their direction of inclination would have to be reversed to match in parallel the aft direction of inclination of the aft three rows, yet again, where space permits near the forward hook.

However, the forward hook presents a substantial obstacle for the introduction of conventional film cooling holes. The desired location of the hole outlets is determined by the specific heat load from the combustion gases, which in turn determines the location of the corresponding inlets inclined therefrom.

The film cooling holes must be distributed both axially and circumferentially for matching the heat loads and for maintaining structural integrity of the turbine wall itself. The optimum shallow inclination angle of conventional film cooling holes may then cause their inlets to interfere with the forward hook in this example.

By inclining the forward holes in FIG. 4 oppositely to the aft holes the limited surface area in the pocket 38 may be used to advantage for distributing the limited cooling air over the front wall 32, while maintaining in most cases the shallow inclination angles of most, if not all, of the film cooling holes distributed throughout the pocket 38.

The new configuration of the oppositely inclined rows of film cooling holes illustrated in FIGS. 4 and 6 permits counterflow in opposite directions between any adjacent pair of film cooling holes in closely adjacent rows thereof. For example, the film cooling holes 1-4 in the first four rows may be oppositely inclined longitudinally in pairs so that the inclined holes converge in longitudinal direction from the back side 30 initially toward the opposite front side 32. In this example, the first and third holes 1,3 initially converge together as they extend downwardly from the back side 30.

Adjacent film cooling holes may also be oppositely inclined to diverge apart in longitudinal direction toward the front side 32. In FIG. 4, the first and third holes 1,3 diverge in this fashion, as well as the second and third holes 2,3 and the second and fourth holes 2,4.

In the exemplary embodiment illustrated in FIG. 4, adjacent film cooling holes may both converge together from the back side 30 and diverge apart toward the front side 32, while increasing the extent of overcrossing or crossing in the longitudinal direction without intersecting. This overcrossing of counterflow film cooling holes is represented by the first and third holes 1,3 which cross near the back side 30, as well as by the second and third holes 2,3 which cross near the middle of the wall thickness.

Depending upon the longitudinal position of the adjacent film cooling holes, the amount of crossing can be varied from little to great between the corresponding inlets and outlets thereof. For example, the corresponding inlets 44 may be laterally aligned with minimum longitudinal overcross or overlap (not shown). Or, the inlets may be longitudinally offset from each other with different extent as shown in FIG. 6 for hole pairs 1,3; 2,3; and 2,4. Correspondingly, the respective outlets 46 of the counterflow film cooling holes may be offset forward and aft from the inlets thereof as shown in FIGS. 4 and 6, or could be laterally aligned with minimum overcross or overlap in another embodiment not shown.

FIG. 5 illustrates the predominant oblique inclination of the combustion gases 20 as they are discharged from the nozzle vanes toward the first stage turbine blades. The film cooling holes 1-5 are preferably skewed relative to the axial axis or centerline axis of the shroud at an inclination or skew angle D in the lateral or circumferential direction. In this way, the inlets 44 of the individual film cooling holes are laterally offset or staggered from their respective outlets 46 in a similar fashion in each of the five rows, and preferably with the skew angle varying as required between the several rows.

The exemplary film cooling holes 1-5 illustrated in FIG. 5 are cylindrical in section along their longitudinal or centerline axes, and result in the oval outlets 46 illustrated in FIG. 5 having major axes disposed substantially normal to the incidence angle of the combustion gases 20 for spreading the discharged film cooling air relative thereto.

The oblique skew angle D illustrated in FIG. 5 also permits the longitudinal length L of the individual film cooling holes to be increased where practical when achieving the shallow slope angle A, as well as for effecting the various counterflow and overcrossing species of the adjacent film cooling holes without intersection thereof while maintaining suitable spacing therebetween.

Since the counterflow cooling holes have shallow inclination angles, they are effective for providing enhanced film cooling from the corresponding outlets thereof. Furthermore, in the various overcrossing species of the counterflow holes, additional internal convection cooling of the wall itself may be obtained in the immediate region of the overcrossing holes.

In the exemplary embodiment illustrated in FIG. 5, the several outlets 46 of the several rows of film cooling holes 1-5 are collectively distributed longitudinally and laterally with corresponding pitch or spacing B,C therebetween in a 2D outlet pattern for the entire front side 32 of the wall. This outlet pattern includes a high density grouping or region identified by the outlets for the aft three rows of holes 3-5, and a relatively low density grouping or region identified by the outlets for the forward two rows of the film cooling holes 1,2.

The high density region of the outlets 46 as illustrated in FIG. 4 corresponds with the aft end of the turbine blades 24 wherein the shroud aft end is subject to relatively high heat loads from the combustion gases. The high density region therefore provides locally enhanced film cooling for the shroud aft end.

Correspondingly, the low density region of holes 1,2 is disposed upstream near the forward ends of the turbine blades, and the shroud forward end requires less cooling for the relatively low heat loads in this region.

As shown in FIGS. 4 and 5, the high and low density regions are bridged by the film cooling holes in longitudinally adjacent rows by the longitudinally opposite inclination thereof in counterflow. For example, holes 2 overcross holes 1 and 3 in counterflow therewith. And, holes 1 overcross holes 3 in further counterflow. These first three rows of overcrossing holes 1-3 are thereby packed closely together side by side in the limited area of the pocket 38 and may all enjoy the optimum, shallow inclination angle thereof down to about 15 degrees.

In the species illustrated in FIGS. 4 and 5, the high density region of outlets 46 is disposed longitudinally aft or downstream from the low density region of the outlets 46. This configuration provides enhanced performance for military aircraft engines in particular.

Alternatively, the high density region of the outlets may be disposed longitudinally forward of the low density region corresponding respectively with the forward and aft ends of the turbine rotor blades. This configuration (not shown) can provide enhanced performance for commercial aircraft engines.

As shown in FIGS. 3 and 4, the several inlets 44 of the several rows of film cooling holes 1-5 are collectively distributed longitudinally and laterally in an inlet pattern over the back side 30 of the wall inside the pocket 38 in a smaller surface area than the pattern of outlets 46 illustrated in FIG. 5. The entire front side 32 of the turbine shroud is exposed to the hot combustion gases during operation. However, the forward and aft hooks and side rails bound the pocket 38 and limit the available area of the pocket for receiving the cooling air to correspondingly less than the front side area.

The pattern of outlets 46 may be distributed over a larger surface area on the shroud front side for providing effective cooling thereof, with the corresponding film cooling holes being commonly fed from the central supply pocket 38 in which the corresponding inlets 44 are disposed over a smaller surface area.

The ability to include oppositely inclined, counterflow film cooling holes within the full pattern of holes permits additional tailoring of that pattern within the limited area provided by the pocket 38 for maintaining the inclination angles of most, if not all, of the film cooling holes at or near the optimum value thereof.

In the exemplary embodiment illustrated in FIG. 4, the pattern of outlets 46 includes three rows of film cooling holes 3,4,5 inclined longitudinally aft between the back and front sides 30,32, with the corresponding inlets thereof being disposed forward of the outlets. In this way, the holes 3-5 incline aft to position the outlets thereof in the desired region of high heat load, with the last two rows of holes 4,5 extending under the aft hook 36.

Correspondingly, two rows of film cooling holes 1,2 are inclined longitudinal forward in this embodiment between the back and front sides of the wall, with the corresponding inlets being disposed aft of the outlets. These forwardly inclined holes position the outlets in the low heat load region and initiate film cooling of the front side which film cooling continues aft and is re-energized by the aft inclined film cooling holes.

As indicated above with respect to FIG. 5, the combustion gases 20 flow obliquely in the downstream direction as they pass below the turbine shroud. The several rows of film cooling holes are therefore skewed from the longitudinal or axial direction to provide oval outlets whose major axes are oblique or perpendicular to the flow streamlines for improving the film cooling effect.

The various rows of forward and aft inclined holes 1-4 overcross each other at least in part longitudinally, and vary in skew angle D laterally to prevent intersection between the discrete film cooling holes and avoid flow communication therebetween. FIG. 5 illustrates the various skew angles D of the longitudinal directions of the corresponding film cooling holes in the five exemplary rows thereof. The high density outlets 46 in the aft three rows of holes 3-5 have a relatively close pitch spacing B,C both longitudinally and laterally. These hole also have a relatively large skew angle D.

Correspondingly, the low density outlets 46 of the forward two rows of holes 1,2 have a larger pitch spacing B,C both longitudinally and laterally, with correspondingly smaller skew angles D.

FIG. 7 reproduces a portion of the exemplary turbine shroud illustrated in FIG. 5 which includes the low density outlets 46 of the forward two rows of holes 1,2, and the high density outlets 46 of the aft three rows of holes 3,4,5. FIG. 7 also includes a flowchart summarizing the preferred method for distributing the plurality of film cooling holes 1-5 through the wall 28 of the turbine shroud for maximizing effectiveness of those limited number of holes in the counterflow configuration thereof.

The high density rows of film cooling holes 3,4,5 are preferably introduced first in the desired location of the turbine shroud, such as the aft portion thereof. Then, the additional forward rows of low density film cooling holes 1,2 are distributed through the forward portion of the turbine shroud in counterflow with the high density holes. The high density holes are inclined through the wall in a first or aft direction, and the low density holes are inclined through the wall in an opposite or forward second direction.

Counterflow is effected by laterally offsetting or staggering the forward and aft inclined holes from each other to prevent intersection thereof while ensuring that the oppositely inclined holes overcross at least in part. Some or all of the film cooling holes in the longitudinally adjacent rows of the oppositely inclined holes may overlap or overcross longitudinally in various amounts for effecting the desired optimum shallow inclination thereof within the limited surface area provided by the air supply pocket 38.

The high density holes 3-5 are first introduced at correspondingly shallow slope angles A as illustrated in FIG. 6, for example, to effect a substantially uniform pattern of the outlets 46 in the front side 32 of the shroud as illustrated in FIG. 5. The low density holes 1,2 may then be distributed through the wall at correspondingly shallow slope angles A to complement the high density holes.

The skew angle D of the low density holes 1,2 may then be varied as required to prevent intersection of the low density holes with the oppositely inclined high density holes.

Since the longitudinal and lateral spacing B,C of the high density holes 3-5 is preferably uniform, the longitudinal and lateral spacing B,C of the low density holes 1,2 may be varied in conjunction with varying the skew angle D thereof for preventing intersection between the oppositely inclined counterflow holes.

Furthermore, the length L of the various film cooling holes may also be varied to assist in preventing intersection of the counterflow holes.

FIG. 5 illustrates the complete pattern of the five rows of film cooling holes 1-5 in an exemplary embodiment in which longitudinal and lateral spacing B,C and skew angle D and length L of the various holes have been selected for introducing the counterflow film cooling holes in a preferred pattern specifically tailored for greater heat loads at the aft end of the shroud.

FIG. 4 illustrates a representative cross section of the shroud in which the first holes 1 are disposed in crossflow with the third holes 3 near their inlets. The second holes 2 are also disposed in crossflow with the third holes 3 near their middle. And, the second and fourth holes 2,4 are disposed in counterflow, but not in crossflow since they are longitudinally spaced apart from each other in whole.

However, FIG. 6 illustrates another section of the turbine shroud near one of the side rails as illustrated in FIG. 5 which generally matches the cross section of FIG. 4, except that one of the fourth holes 4 overcrosses in crossflow one of the second holes 2.

Since the various rows of film cooling holes illustrated in FIG. 5 have corresponding skew angles D which are oblique to the longitudinal or axial axis of the shroud, local tailoring of the film cooling holes is required near the side rails, and near the aft hook in particular. The row of fourth holes 4 illustrated in FIG. 5 is generally uniform, but in view of the large skew angle D thereof insufficient space exists at the left side of the shroud for introducing the left-most hole 4 in substantially the same orientation as the remainder of holes 4.

Accordingly, the local position of the left-most hole 4 is varied from the remainder of fourth holes 4 so that the outlet 46 thereof is aligned with the remainder of outlets in the fourth row, with the inlet of this left-most fourth hole 4 being suitably located to prevent interference with the side rail and the other film cooling holes in the shroud.

Since the film cooling holes 1-5 should be inclined at the optimum shallow inclination angle of about 15 degrees, the inclination angle thereof may be varied lastly as required to prevent intersection between adjacent film cooling holes. Increasing the inclination angle A of the film cooling holes may be required near the opposite side rails illustrated in FIGS. 2 and 5, and near the forward and aft hooks where these components interfere with the optimum placement of the film cooling holes.

As indicated above, the use of typical film cooling holes in turbine shrouds is conventional, and the patterns thereof must be modified as required near the forward and aft hooks and side rails in view of the obstructions therefrom. Each design requires tailoring for the specific heat loads experienced by the shroud and for the specific geometry thereof.

Various forms and configurations of film cooling holes may be used in the turbine shroud disclosed above in otherwise conventional practice. However, the ability to introduce counterflow film cooling holes and their overcrossing or crossflow advantages as described above permits additional tailoring of the cooling performance of turbine shrouds.

The turbine shroud disclosed above may be otherwise conventional in configuration, yet modified for the introduction of the counterflow film cooling holes as required for the specific engine application. The exemplary turbine shroud disclosed above may be used as a retrofit for the previous imperforate turbine shroud protected solely by the TBC. Instead, the turbine shroud disclosed above is devoid of any TBC, and relies on the special pattern of film cooling holes including the counterflow holes therein for achieving the desired long life of the shroud in operation, at the efficiency cost of providing the film cooling air therethrough.

The introduction of the counterflow film cooling holes is not limited to the turbine shroud component disclosed above. For example, the flowchart in FIG. 7 illustrates schematically that the counterflow film cooling holes may also be used in any turbine component or part 48 in a gas turbine engine which is otherwise cooled by unidirectional film cooling holes. Where the geometry in the miscellaneous turbine part prevents introduction of optimally inclined film cooling holes, the counterflow holes disclosed above may be introduced where practical.

Examples of such additional turbine parts have been disclosed above, and include the airfoils of the turbine vanes and blades, and the combustor liner itself.

The introduction of the counterflow film cooling holes in the various turbine components allows more film cooling holes to be drilled at the optimum shallow breakout angles of about 15 degrees and thereby reduces the number of conventional holes having larger breakout angles due to geometrical constraints. The optimum inclination angles correspondingly increase the film coverage from each hole which in turn reduces the need for additional non-optimized film holes with larger inclination angles which would require more chargeable cooling flow from the compressor.

The various film cooling holes disclosed above are shown in their simple cylindrical configuration with relatively constant flow area between the inlets and outlets thereof. In alternate embodiments, other forms of film cooling holes could also be used, such as the more complex diffusion film cooling holes that increase in flow area between their inlets and outlets for diffusing the cooling air, and correspondingly reducing the velocity thereof.

An additional advantage of the overcrossing film cooling holes disclosed above is the local increase in internal convection cooling of the turbine wall itself in the region of crossing. Nevertheless, sufficient material exists between adjacent holes to prevent flow communication therebetween while also maintaining structural integrity of the wall without undesirably large stress therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

The invention claimed is:

1. A turbine wall comprising a plurality of film cooling holes inclined longitudinally therethrough in three rows having corresponding longitudinal pitch spacing therebetween, with overcrossing adjacent rows thereof having adjacent holes being spaced apart laterally and inclined oppositely for channeling cooling air therethrough in counterflow.

2. A wall according to claim 1 wherein said plurality of film cooling holes are arranged in row pairs extending laterally in longitudinal counterflow with each other.

3. A wall according to claim 2 wherein each of said holes includes an inlet on a back side of said wall, and an outlet on an opposite front side of said wall, and said holes in adjacent rows are inclined oppositely between respective inlets and outlets to channel said cooling air in longitudinal counterflow in discrete jets of air spaced laterally apart.

4. A wall according to claim 3 wherein said film cooling holes in adjacent rows are oppositely inclined longitudinally to converge from said back side.

5. A wall according to claim 3 wherein said film cooling holes in adjacent rows are oppositely inclined longitudinally to diverge toward said front side.

6. A wall according to claim 3 wherein said film cooling holes in adjacent rows are oppositely inclined longitudinally to converge from said back side and diverge toward said front side.

7. A wall according to claim 3 wherein said film cooling holes are skewed laterally, with said inlets thereof being laterally offset from respective outlets.

8. A wall according to claim 3 comprising a turbine shroud further including a forward hook extending from said back side adjacent a forward end of said wall, and an aft hook extending from said back side adjacent an aft end of said wall, and said inlets of said film cooling holes are disposed longitudinally between said forward and aft hooks.

9. A method of distributing said plurality of film cooling holes through said wall according to claim 1 comprising:
   distributing multiple rows of said film cooling holes through said wall and inclined therethrough in a first direction between opposite back and front sides thereof for effecting a pattern of outlets thereof on said front side for film cooling thereof;
   distributing additional rows of film cooling holes through said wall and inclined therethrough in a second direction opposite to said first direction, with said second direction holes being offset laterally from said first direction holes; and
   overcrossing longitudinally adjacent rows of said first and second direction holes for effecting shallow inclination thereof.

10. A method according to claim 9 further comprising:
    distributing said first direction holes at shallow inclination angles through said wall to effect a substantially uniform pattern of said outlets thereof in said front side;
    distributing said second direction holes at shallow inclination angles through said wall; and
    varying skew of said second direction holes to prevent intersection with said first direction holes.

11. A method according to claim 10 further comprising varying longitudinal and lateral spacing of said second direction holes to prevent intersection with said first direction holes.

12. A method according to claim 10 further comprising varying length of said second direction holes to prevent intersection with said first direction holes.

13. A method according to claim 10 further comprising varying said inclination angles of said second direction holes to prevent intersection with said first direction holes.

14. A turbine shroud comprising:
    an arcuate wall having opposite back and front sides, and forward and aft hooks extending from said back side at opposite ends thereof; and
    multiple rows of film cooling holes inclined longitudinally through said wall, and including overcrossing adjacent rows of said holes being inclined in opposite aft and forward directions for channeling cooling air therethrough in counterflow.

15. A shroud according to claim 14 further comprising:
    a pocket bounded forward and aft by said hooks and bounded laterally by side rails;
    each of said holes having an inlet on said back side inside said pocket, and an outlet on said front side; and
    said inlets are spaced apart laterally and longitudinally inside said pocket, and said outlets are spaced apart laterally and longitudinally on said front side in different patterns.

16. A shroud according to claim 15 wherein said aft and forward inclined holes converge together from said back side.

17. A shroud according to claim 15 wherein said aft and forward inclined holes diverge apart toward said front side.

18. A shroud according to claim 15 wherein said aft and forward inclined holes converge together from said back side and diverge apart toward said front side.

19. A shroud according to claim 15 wherein said film cooling holes are skewed laterally, with said inlets thereof being laterally offset from respective outlets.

20. A shroud according to claim 15 wherein:
    said outlets of said film cooling holes are distributed longitudinally and laterally in a pattern over said front side including a high density region and a relatively low density region; and
    said aft and forward direction holes are oppositely inclined in counterflow between said high and low density regions.

21. A shroud according to claim 20 wherein said high density region of said outlets is disposed longitudinally aft of said low density region of said outlets.

22. A shroud according to claim 15 wherein said pattern of outlets is distributed laterally and longitudinally over said front side with a larger surface area than said pattern of inlets inside said pocket.

23. A shroud according to claim 15 further comprising multiple rows of said aft inclined holes and multiple rows of said forward inclined holes, with adjacent rows thereof overcrossing each other to effect said counterflow therethrough.

24. A turbine wall comprising:
    a plurality of film cooling holes inclined longitudinally therethrough, with overcrossing adjacent holes being spaced apart laterally and inclined oppositely for channeling cooling air therethrough in counterflow;
    each of said holes including an inlet on a back side of said wall, and an outlet on an opposite front side of said wall, and said holes in adjacent rows are inclined oppositely between respective inlets and outlets to channel said cooling air in longitudinal counterflow in discrete nets of air spaced laterally apart; and
    said outlets of said film cooling holes are distributed longitudinally and laterally in a pattern over said front side including a high density region and a relatively low density region; and
    said film cooling holes in longitudinally adjacent rows are oppositely inclined in counterflow between said high and low density regions.

25. A wall according to claim 24 wherein said high density region of said outlets is disposed longitudinally aft of said low density region of said outlets.

26. A wall according to claim 24 wherein said inlets of said film cooling holes are distributed longitudinally and laterally in a pattern over said back side in a smaller surface area than said pattern of outlets.

27. A wall according to claim 24 wherein said pattern of outlets includes multiple rows of film cooling holes inclined aft between said back and front sides, and multiple rows of film cooling holes inclined forward therebetween.

28. A wall according to claim 27 wherein said forward and aft inclined holes overcross longitudinally and vary in skew laterally to prevent intersection thereof.

* * * * *

UNITED STATES PATENT AND TRADEMARK OFFICE
CERTIFICATE OF CORRECTION

PATENT NO. : 7,296,967 B2
APPLICATION NO. : 11/224922
DATED : November 20, 2007
INVENTOR(S) : Jason David Shapiro Page 1 of 1

It is certified that error appears in the above-identified patent and that said Letters Patent is hereby corrected as shown below:

In The Specification

In Column 1, Line 4, delete "K7844-GN-03-5266E." and insert -- N00019-03-C-0361 --

Signed and Sealed this
Fourteenth Day of June, 2016

Michelle K. Lee
*Director of the United States Patent and Trademark Office*